E. A. HAWTHORNE.
BATTERY RECEPTACLE.
APPLICATION FILED JULY 31, 1913.
1,223,167.
Patented Apr. 17, 1917.
2 SHEETS—SHEET 1.
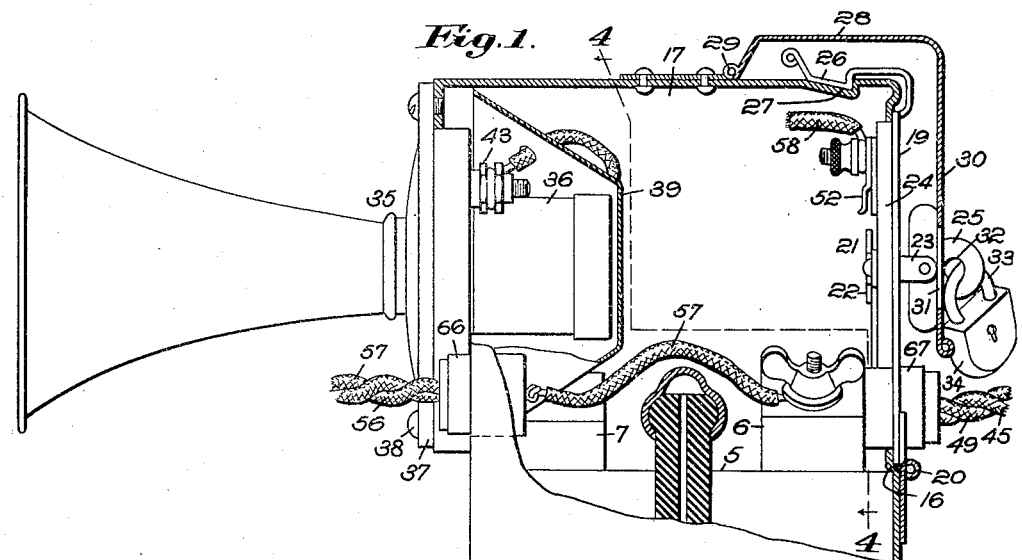
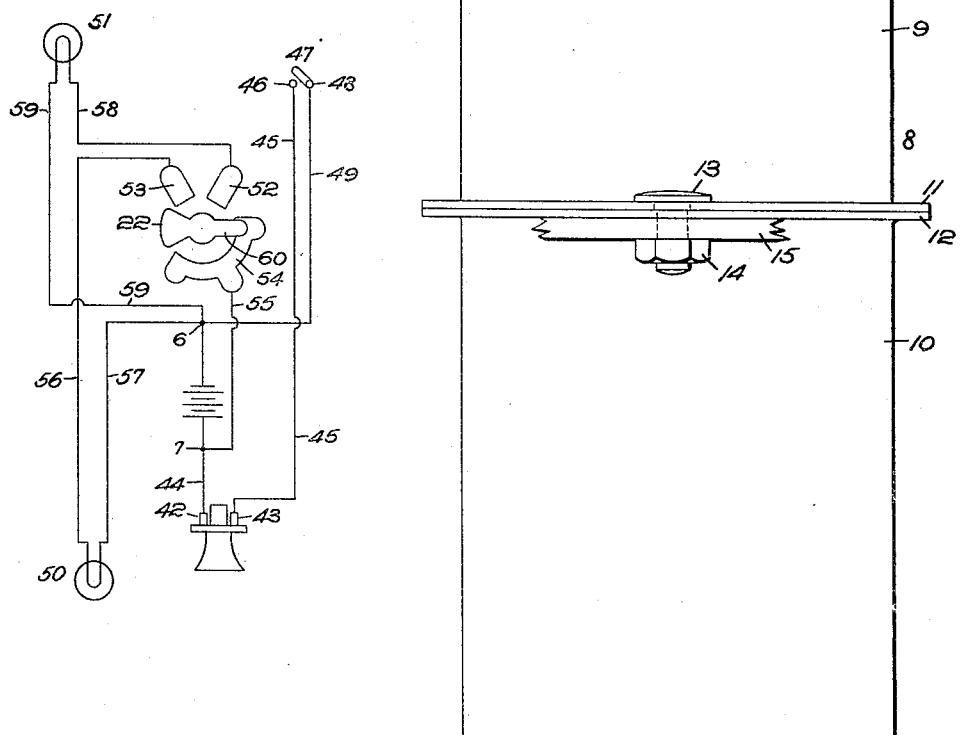
Witnesses:
Horace A. Crossman
Carl L. Choate
Inventor:
Ellsworth A. Hawthorne
by Emery, Booth, Janney & Varney
Attys.

E. A. HAWTHORNE.
BATTERY RECEPTACLE.
APPLICATION FILED JULY 31, 1913.

1,223,167.

Patented Apr. 17, 1917.
2 SHEETS—SHEET 2.

Witnesses:
Horace A. Crosman
Carl L. Choate

Inventor:
Ellsworth A. Hawthorne
by Emery, Booth, Janney & Varney
Attys

UNITED STATES PATENT OFFICE.

ELLSWORTH A. HAWTHORNE, OF BRIDGEPORT, CONNECTICUT.

BATTERY-RECEPTACLE.

1,223,167.  Specification of Letters Patent.  Patented Apr. 17, 1917.

Application filed July 31, 1913. Serial No. 782,214.

*To all whom it may concern:*

Be it known that I, ELLSWORTH A. HAWTHORNE, a citizen of the United States, and a resident of Bridgeport, county of Fairfield, and State of Connecticut, have invented an Improvement in Battery-Receptacles, of which the following description, in connection with the accompanying drawings, is a specification, like characters on the drawings representing like parts.

This invention relates to electric lighting and signaling apparatus, and more especially to a battery, battery casing, and switch mechanism, intended for use on vehicles such for example as motor cycles, and is designed to centralize the current supply, electric horn and switch mechanism for controlling the several circuits, and to afford protection for the parts from external influences, such as dust and water, as well as from tampering by unauthorized persons.

My invention will be best understood by reference to the following specification, when taken in connection with the accompanying drawings of one illustrative embodiment thereof, while its scope will be more particularly pointed out in the appended claims.

In the drawings:

Figure 1 is a side elevation, partly in vertical section, of a portion of an electric lighting and signaling apparatus embodying my invention;

Fig. 2 is a diagram illustrating the arrangement of the wiring;

Figure 3:
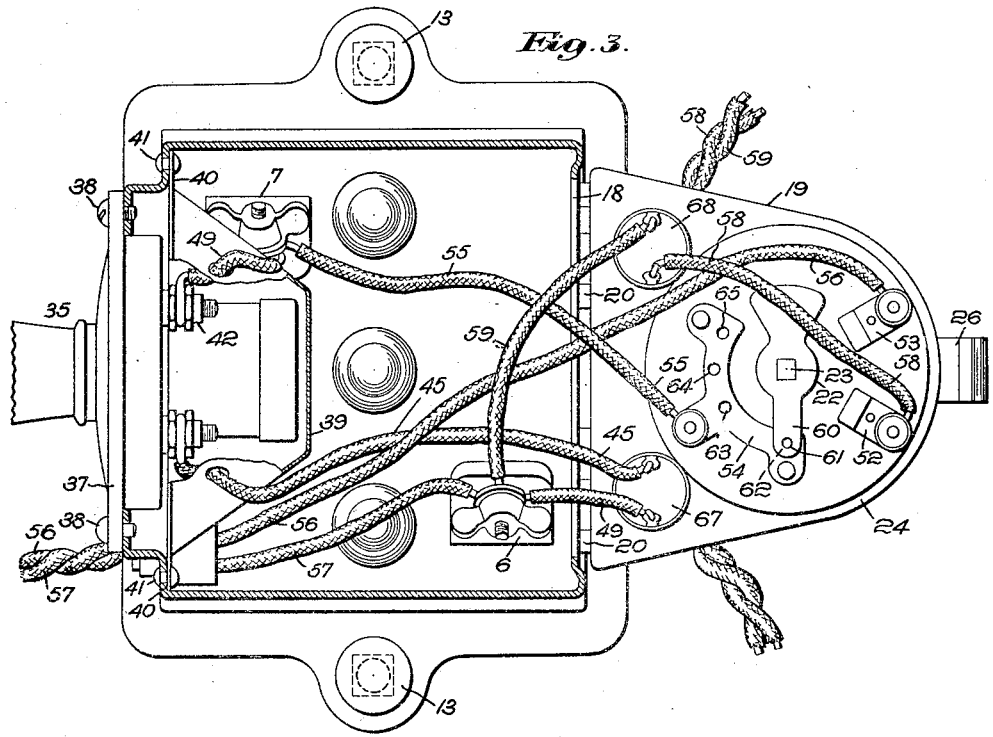
Fig. 3 is a plan sectional view of a portion of the apparatus, showing the door of the battery casing open.
Figure 4:
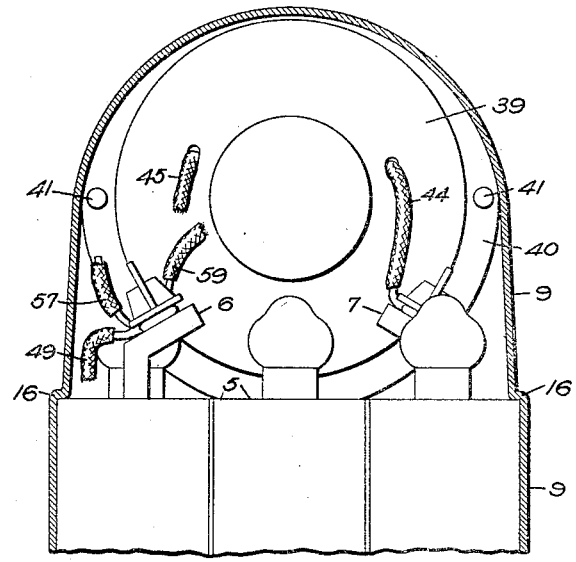
Fig. 4 is a sectional view, partly broken away, on line 4—4 of Fig. 1.

Referring to the drawings, and to the embodiment of my invention which I have selected for illustration, I have there shown an electric lighting and signaling apparatus which may have other uses, but is particularly intended to be used in connection with a motor cycle, and when so used is intended to be appropriately mounted upon the steering structure forward of the handle bar, directly in front of the rider, at which point the control of the apparatus is centralized.

In the illustrative embodiment shown, 5 is a battery which may be of any other appropriate type, but as herein shown is a familiar form of storage battery, having terminals 6 and 7. The battery may be mounted in any other appropriate casing, but herein is provided with a casing designated generally by the numeral 8, comprising upper and lower parts 9 and 10, respectively, which preferably abut between the top and bottom of the battery, and are provided with suitable means whereby they are secured together. In the present embodiment, the upper section 9 of the casing is provided with a laterally projecting flange 11, and the lower section 10 is provided with a similar laterally projecting flange 12. These flanges may be secured together by any other appropriate means, but herein two bolts 13—13, passing through both flanges, are provided with nuts 14, by means of which the flanges may be drawn together and thus securely held in the desired relation. If desired, the bolts 13 may pass through an appropriate support, partially shown at 15, placed beneath the lower flange and serving to support the battery and its casing. As a means for securely holding the battery in its proper position in the casing, and preventing it from rising therein owing to road shocks, the upper section of the casing is preferably provided with an inwardly extending shoulder 16 engaging the upper edge of the battery and effectually holding the same immovable.

As a means for housing the switch mechanism and connections, the battery casing is preferably provided with a chamber 17 above the battery. This chamber is preferably provided with an opening 18, leading to the exterior of the casing, and this opening is herein provided with a door 19 for said opening. By this means, the interior of the hood, or top, of the casing, is rendered accessible to the rider by simply opening the door, the latter being preferably provided with a hinge 20, which may be placed at its lower edge.

Mounted within the chamber 17 is a switch designated generally by the numeral 21, and which may be and preferably is mounted upon the door 19. This switch may be of any other appropriate construction, but herein comprises a movable contact plate 22, secured to a shaft 23, the latter being journaled in an insulating plate 24, and extending through the door 19 to the exterior of the casing, where it is provided with a key, or handle, 25, by means of which it may be rotated.

As a means for holding the door in its closed position, the latter may be provided with any appropriate form of latch, such for example as the spring-latch 26, secured to the door and adapted to snap into a depression 27 formed in the top of the casing. By simply grasping the free end of the latch and lifting the same, the door may be swung open from the position shown in Fig. 1 to the position shown in Fig. 3.

In order to render the interior of the casing inaccessible to unauthorized persons, and to prevent such persons from tampering with the switch, I have herein provided means for locking the switch in its "off" position, and the door in its closed position. Such locking means may be of any other appropriate construction, but herein I have provided a hasp 28 hinged at 29 to the top of the casing, and having a depending arm 30 provided with a slot 31, which receives the key or handle 25 of the switch, and prevents the latter from being rotated. The key or handle 25 is herein provided with an eye 32 to receive the pivoted bolt 33 of a padlock 34. When the rider wishes to operate the switch, he simply removes the padlock, and swings the hasp on its hinge rearwardly and upwardly out of engagement with the switch key, so that the latter may be grasped and turned.

Mounted on the battery casing is an appropriate signal device, herein in the form of an electric horn 35 of the vibrator type, having a vibrator casing 36 extending into the chamber 17. The horn may be secured to the casing in any other appropriate manner, but is herein provided with a flange 37 secured to the casing by a plurality of screws 38. As a means for protecting the vibrator from the fumes arising from the battery, I have herein provided a partition wall 39 between the vibrator casing and the bottom of the battery, this wall being preferably generally frusto-conical in form, and having its base portion provided with a marginal flange 40 secured to the front of the battery casing by rivets 41.

The electric horn is herein provided with binding posts 42 and 43, the former being connected by a wire 44 to the terminal 7 of the battery, while the other binding post is connected by a wire 45 to one contact 46 of an electric push button 47, represented diagrammatically in Fig. 2, and intended in practice to be placed upon one of the handles of the handle bar of the motor cycle. The other contact 48 of the push button is connected by a wire 49 to the other terminal 6 of the battery.

In Fig. 2, I have represented in a conventional manner a headlight 50 and a taillight 51, either or both of which may be connected at will in circuit with the battery through the use of the switch 21. For this purpose, the latter is herein provided with two stationary contacts 52 and 53, and a contact plate 54, the latter being connected by a wire 55 to the terminal 7 of the battery. The two terminals of the headlight 50 are connected respectively by wires 56 and 57 with the contact 53, and battery terminal 6, while the terminals of the taillight 51 are connected respectively by wires 58 and 59 to the contact 52, and battery terminal 6.

The movable contact member 22 of the switch has four positions, to wit: the off position shown in Fig. 3, in which neither head nor tail light is lighted; a second position, in which it is in contact with the contact member 53, thus supplying current to the headlight; a third position, in which it is in contact with both contact members 52 and 53, in which position it serves to supply current to the headlight and taillight; and a fourth position, in which it supplies current to the taillight alone. As a means for yieldingly retaining the movable contact member in each of its four positions, it is herein provided with a yielding arm 60, having a rounded projection 61 adapted to engage any one of a series of depressions 62, 63, 64 and 65, appropriately placed in the contact plate 54 for each of the four positions.

In order to provide means whereby the rider may quickly and conveniently disconnect the headlight, taillight, or push button, from the battery, the wires 56 and 57 may be provided with a plug 66 of common form, mounted in the wall of the casing, the wires 45 and 49 may be provided with a similar plug 67, and the wires 58 and 59 may be provided with a like plug 68, the two latter plugs being mounted in the door 19, as shown in Fig. 3.

While I have herein shown and described one specific embodiment of my invention for illustrative purposes, and have disclosed and discussed in detail the construction and arrangement incidental to one specific application thereof, it is to be understood that the invention is limited neither to the mere details or relative arrangement of parts, nor to its specific embodiment herein shown, but that extensive deviations from the illustrated form or embodiment of the invention may be made, without departing from the principles thereof.

Having thus described my invention, what I claim and desire by Letters Patent to procure is:—

1. In an electrical apparatus, the combination with a battery, of a battery casing comprising upper and lower parts abutting intermediate the top and bottom of said battery, the upper part being provided with a shoulder to prevent upward movement of said battery, and means to secure said parts together.

2. A casing for a given battery comprising a body portion formed of separable parts adapted to fit about the battery and means for securing said parts together, said parts coöperatively forming a casing provided with an aperture too small to pass the battery and a closure for said aperture forming a chamber adjacent the battery.

3. In an electrical apparatus, the combination with a battery, of a battery casing having a chamber above said battery and an opening leading to the exterior of said casing, a door for said opening, a switch mounted within said chamber, connections between said switch and the battery terminals within said chamber, and means to lock said switch and said door.

4. In an electrical apparatus, the combination with a battery, of a battery casing having a chamber above said battery and an opening leading to the exterior of said casing, a door for said opening, a switch mounted within said chamber, connections between said switch and the battery terminals within said chamber, and a hasp for fastening said switch and door.

5. In an electrical apparatus, the combination with a battery, of a battery casing having a chamber above said battery and an opening leading to the exterior of said casing, a door for said opening, a switch mounted within said chamber, connections between said switch and the battery terminals within said chamber, said switch having a handle located exteriorly of said casing on said door, a hasp which receives said handle, and means to lock said hasp in place upon said handle.

6. In an electrical apparatus a battery, a casing therefor providing a chamber adjacent the battery, an opening in the casing leading from said chamber, a closure therefor, a switch in said chamber and a means serving to lock both closure and switch.

7. In an electrical apparatus a battery, a casing therefor providing a chamber adjacent the battery, an opening in the casing leading from said chamber, a closure therefor, a switch in said chamber having an operating handle disposed exteriorly of the casing and a means to lock the closure and also to hold the handle from switch-operating movement.

8. In an electrical apparatus a battery, a casing therefor, a switch and connections between said switch and the battery terminals disposed within said casing, an operating handle for said switch exterior to the casing, a hasp adapted to receive said handle and lock it from switch-operating movement and means to secure handle and hasp together.

In testimony whereof, I have signed my name to this specification, in the presence of two subscribing witnesses.

ELLSWORTH A. HAWTHORNE.

Witnesses:
E. HORACE HAWTHORNE,
E. LOUISE SCOTT.

Copies of this patent may be obtained for five cents each, by addressing the "Commissioner of Patents, Washington, D. C."